United States Patent [19]

Hiketa

[11] Patent Number: 4,875,978
[45] Date of Patent: Oct. 24, 1989

[54] VEHICLE FOUR WHEEL DRIVE SYSTEM

[75] Inventor: Manabu Hiketa, Hiroshima, Japan

[73] Assignee: Mazda Motor Corporation, Hiroshima, Japan

[21] Appl. No.: 86,479

[22] Filed: Aug. 18, 1987

[30] Foreign Application Priority Data

Aug. 20, 1986 [JP] Japan .................................. 61-194940

[51] Int. Cl.⁴ .......................................... B60K 17/344
[52] U.S. Cl. .................................... 180/248; 180/247; 180/249
[58] Field of Search ................. 180/247, 248, 249, 250

[56] References Cited

U.S. PATENT DOCUMENTS

| | | | |
|---|---|---|---|
| 4,457,394 | 7/1984 | Suzuki | 180/248 |
| 4,618,022 | 10/1986 | Hayashi | 180/249 |
| 4,650,202 | 3/1987 | Tsuzuki | 180/248 |
| 4,671,136 | 6/1987 | Katayama | 180/249 |
| 4,677,875 | 7/1987 | Batchelor | 180/248 |
| 4,712,488 | 12/1987 | Lanzer | 180/247 |

FOREIGN PATENT DOCUMENTS

| | | |
|---|---|---|
| 0177286 | 4/1986 | European Pat. Off. . |
| 6162641 | 9/1959 | Japan . |
| 99421 | 6/1982 | Japan .................................. 180/248 |
| 58-56920 | 4/1983 | Japan . |
| 59-201815 | 11/1984 | Japan . |
| 59-202442 | 11/1984 | Japan . |

Primary Examiner—Charles A. Marmor
Assistant Examiner—Eric Culbreth
Attorney, Agent, or Firm—Fleit, Jacobson, Cohn, Price, Holman & Stern

[57] ABSTRACT

A motor vehicle drive system including a transmission having an output gear connected with an idle gear which is provided rotatably on an input member of a front inter-wheel differential gear mechanism which is provided in the front axle assembly. A transfer shaft is provided adjacent to the front axle assembly and has two or more inter-axle differential gear mechanisms which are of different torque split ratios. A selecting mechanism is provided for selectively connecting one of the inter-axle differential gear mechanisms with the idle gear to establish a desired torque split ratio between the front and rear wheels.

8 Claims, 2 Drawing Sheets

VEHICLE FOUR WHEEL DRIVE SYSTEM

CROSS-REFERENCE TO THE RELATED APPLICATIONS

The present invention is related to the inventions illustrated and described in the copending application Ser. No. 011,869 filed on Feb. 6, 1987 and entitled "TORQUE CONTROL SYSTEM FOR VEHICLES", and in the copending application Ser. No. 042,809 filed on Apr. 27, 1987 now U.S. Pat. No. 4,779,699 and entitled "FOUR WHEEL DRIVE VEHICLE", both applications being assigned to the same assignee of the present invention.

BACKGROUND OF THE INVENTION

1. Field of the Invention

The present invention relates to a power transmitting system for motor vehicles and more particularly to a four wheel drive system for motor vehicles. More specifically, the present invention pertains to a torque splitting mechanism for distributing the driving torque to the front and rear wheels with a predetermined torque splitting ratio.

2. Description of the Prior Art

It has been known in the art of four wheel drive vehicles to provide a torque splitting mechanism for distributing the engine drive torque between the front and rear wheels with a predetermined torque split ratio. For example, in Japanese patent application No. 56-155853 filed on Sept. 29, 1981 and disclosed for public inspection on Apr. 4, 1983 under the disclosure No. 58-56920, there is disclosed a vehicle drive system provided with an intermediate transfer clutch for adapting the vehicle alternately to a two wheel drive type or to a four wheel drive type. The engagement of the transfer clutch is controlled so that the torque transmitting capacity of clutch is changed to thereby change the torque split ratio between the front and rear wheels.

It should however be noted that in the mechanism as disclosed by the Japanese patent application there is a problem of the clutch facing material being rapidly worn since the transfer clutch is frequently operated with a partly engaged condition. Further, the frictional force produced in the transfer clutch changes depending on the ambient temperature and the humidity. Besides, the condition of engagement of the transfer clutch is influenced by the vibrations of the vehicle body. Thus, the control of the torque split ratio in the proposed system is not accurate and reliable to a satisfactory extent.

In the Japanese patent application No. 59-182577 filed on Sept. 3, 1984 and disclosed on May 31, 1986 under the disclosure No. 61-62641, there is disclosed a motor vehicle four wheel drive mechanism which includes a plurality of differential gear sets provided on the front axle and a selecting device for selecting a desired one of the differential gear sets to establish a desired torque split ratio between the front and rear wheels. In the European patent application No. 85306877.3 filed on Sept. 27, 1985 and published on Apr. 9, 1986 under the publication No. 0177286, there is disclosed a similar vehicle driving system. The European patent application corresponds to the Japanese patent application Nos. 59-202442 filed on Sept. 27, 1984 and 59-201815 filed on Dec. 24, 1984.

The driving systems as proposed by these applications are considered as being free from the problems inherent to the driving system having the aforementioned intermediate transfer clutch. These systems are not however satisfactory because a complicated mechanism is required for providing two or more differential gear sets on a front or rear drive axle. It should further be noted that a plurality of differential gear sets provided on a single drive axle will make it necessary to increase the length of the drive axle and to thereby decrease to corresponding extent the lengths of the wheel drive shafts which are connected to the drive axle. Such decrease in the lengths of the drive shafts will cause an undesirable increase in the angle between the drive axle and the drive shafts.

SUMMARY OF THE INVENTION

It is therefore an object of the present invention to provide a variable torque splitting mechanism for motor vehicle four wheel drive systems, which is reliable in operation and durable but simple in structure.

Another object of the present invention is to provide a torque splitting mechanism for vehicle four wheel drive systems, which does not have any influence on the length of the drive axle.

A further object of the present invention is to provide a torque splitting mechanism for vehicle four wheel drive systems, which is suitable for a drive system having a power transmission arranged with its axis transversely of the vehicle body.

According to the present invention, the above and other objects can be accomplished, in a motor vehicle having a body and front and rear wheels respectively provided in front and rear portions of the body, by a power transmitting mechanism including transmission means having an input member and an output member arranged in a transverse direction of the body, first drive axle means arranged in a transverse direction of the body and connected with one of the front and rear wheels for transmitting a rotation to said one of the front and rear wheels, second drive axle means arranged in a transverse direction of the body and connected with the other of the front and rear wheels for transmitting a rotation to said other of the front and rear wheels, a transfer shaft arranged to extend in a transverse direction of the body and provided with torque splitting means for transmitting a driving torque from the transmission means to said first and second drive axle means with a predetermined torque splitting ratio, said torque splitting means including a plurality of inter-axle differential gear mechanisms having different torque splitting ratios and selecting means for selectively operating one of said differential gear mechanisms to establish a desired torque splitting ratio between the first and second drive axles.

Typically, the transmission means is provided in the front portion of the body. The first drive axle means may be a front wheel drive axle assembly and the second drive axle means may be a rear wheel drive axle assembly. Both of the drive axle assemblies may be provided with inter-wheel differential gear mechanisms and the torque splitting means then functions to transmit the driving torque from the transmission means respectively to the inter-wheel differential gear mechanisms in the front and rear drive axle means. The transfer axle may be located adjacent to the front drive axle assembly. An appropriate speed reduction gear mechanism may be provided between the torque splitting means and the front inter-wheel differential gear mechanism.

The above and other objects and features of the present invention will become apparent from the following descriptions of a preferred embodiment taking reference to the accompanying drawings.

DESCRIPTION OF THE PREFERRED EMBODIMENT

Figure 1:
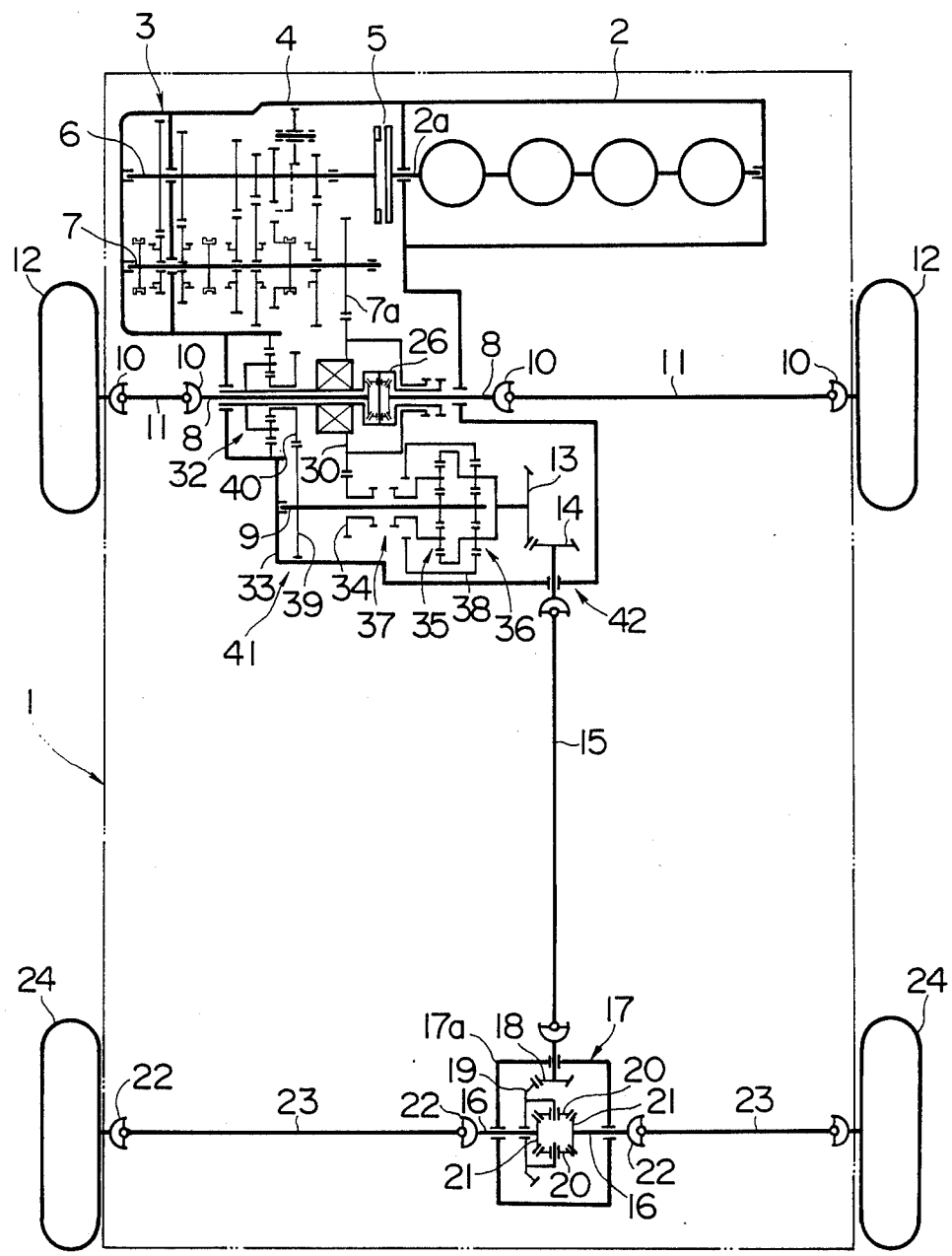
FIG. 1 is a diagrammatical view of a vehicle power transmitting system in accordance with one embodiment of the present invention; and, FIG. 2 is sectional view showing the front inter-wheel differential gear mechanism and the inter-axle differential gear mechanisms.

Referring to the drawings, particularly to FIG. 1, there is shown a vehicle having a body 1 and an engine 2 mounted on the body 1. The engine has an output shaft 2a which is arranged in the transverse direction of the vehicle body 1. Adjacent to one end of the engine 2, there is a transmission 3 which is, in the illustrated embodiment, of a manual type. The transmission 3 includes a case 4 in which an input shaft 6 and an output shaft 7 are arranged. The input shaft 6 and the output shaft 7 are parallel with each other and extend in the transverse direction of the vehicle body 1. The input shaft 6 of the transmission 3 is connected with the output shaft 2a of the engine 2 through a power clutch 5. The transmission 3 includes a plurality sets of inter-meshing gears of different gear ratios to provide a plurality of gear stages as well known in the art.

The vehicle body 1 is further provided with a pair of front wheels 12 located at the opposite sides of the front portion of the vehicle body 1 and a pair of rear wheels 24 located at the opposite sides of the rear portion of the vehicle body 1. The front wheels 12 are connected through universal joints 10 with one end of drive shafts 11 which are in turn connected at the other ends through universal joints 10 with one ends of axially aligned front axle shafts 8. A front inter-wheel differential gear mechanism 26 is provided between the other ends of the axially aligned front axial shafts 8. The rear wheels 24 are connected respectively through universal joints 22 with one ends of drive shafts 23 which is in turn connected at the other ends through universal joints 22 with one ends of axially aligned rear drive axle shafts 16. Between the other ends of the rear drive axle shafts 16, there is a rear differential gear mechanism 17.

The rear differential gear mechanism 17 includes a rear differential gear housing 17a which rotatably carries the rear drive axles 8. In the housing 17a, there is an input bevel gear 18 which is connected with a longitudinally extending propeller shaft 15. The input bevel gear 18 is in meshing engagement with a bevel gear formed on a differential casing 19 which is rotatably mounted on one of the rear drive axles 16. The differential casing 19 carries a pair of bevel pinions 20 which are in meshing engagement with bevel gears 21 provided on the inner ends of the rear drive axles 16.

It will be noted in FIG. 1 that the transmission 3 has an output gear 7a which is in meshing engagement with an idle gear 30 rotatably carried by the axially aligned front drive axles 8. The idle gear 30 is adapted to be engaged selectively with either of a pair of inter-axle differential gear mechanisms 35 and 36 which are provided on a transfer shaft 9. The inter-axle differential gear mechanisms 35 and 36 are provided on one hand with an output gear 13 which is engaged with a bevel gear 14 provided on the front end of the propeller shaft 15, and on the other hand with an output gear 39 which is connected through a speed reduction gear mechanism 32 with the front inter-wheel differential gear mechanism 26.

Figure 2:
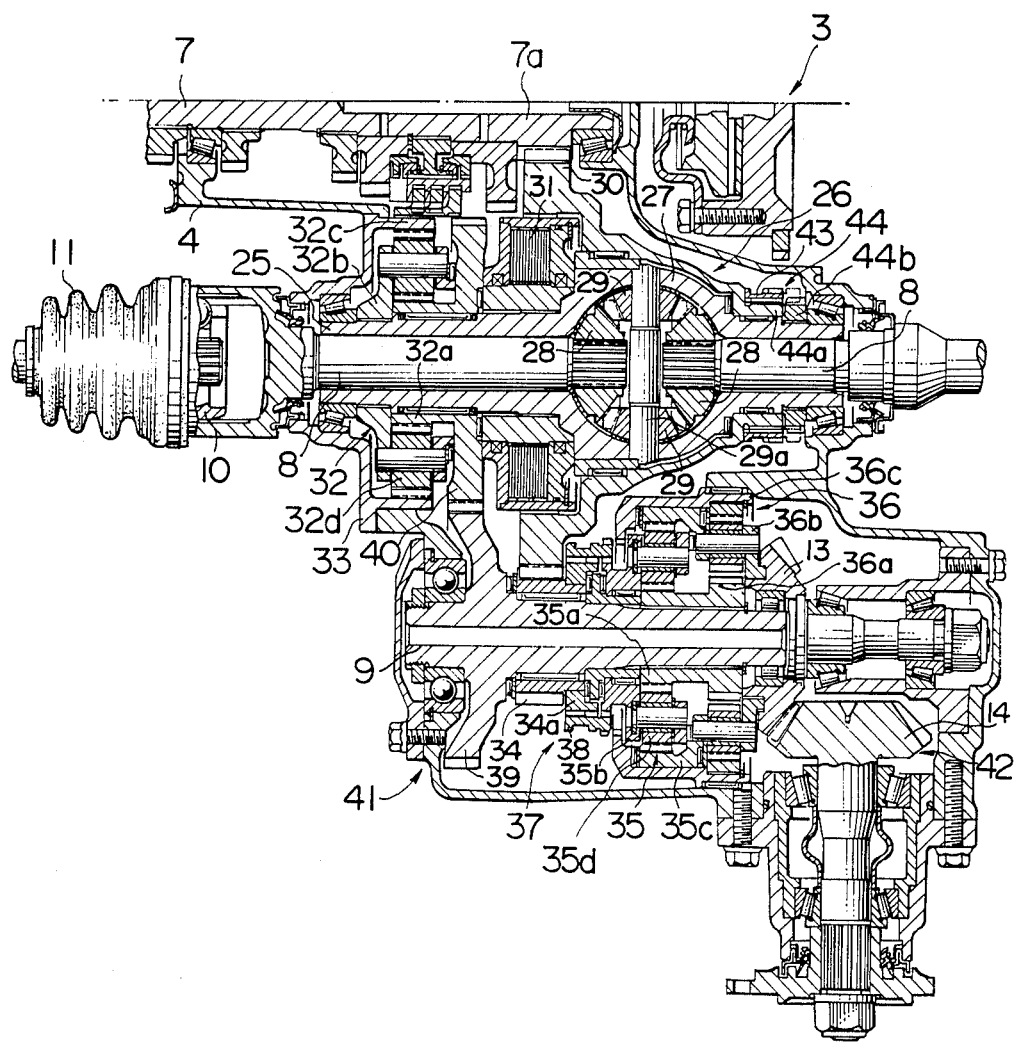

Referring now to FIG. 2 together with FIG. 1, it will be noted that the front inter-wheel differential gear mechanism 26 includes a differential casing 27 which is rotatably mounted on the front drive axles 8 through an integrally formed sleeve 25. The drive axles 8 have side bevel gears 28 which are located in the casing 27 and secured to the drive axles 8. The casing 27 carries a pair of bevel pinions 29 which are mounted on the casing 27 through stub shafts 29a extending perpendicularly to the drive axles 8. The pinions 29 are in meshing engagement with the gears 28 on the drive axles 8.

The aforementioned idle gear 30 is mounted on the differential casing 27 through appropriate bearings and connected with the differential casing 27 through a viscous coupling 31 which is located at the left side of the front inter-wheel differential gear mechanism 26. The speed reduction gear mechanism 32 is located at the left side of the viscous coupling 31 and comprises a single pinion planetary gear mechanism including a sun gear 32a mounted rotatably on the sleeve 25, a pinion carrier 32b secured to the sleeve 25 and a ring gear 32c formed in a casing 33 which is secured to the casing 4 of the transmission 3. The pinion carrier 32b carries pinions 32d which are in meshing engagement with the sun gear 32a and the ring gear 32c.

On the transfer shaft 9, there is mounted a gear 34 which is freely rotatable and engaged with the idle gear 30. In the illustrated embodiment, the gear 34 is smaller in diameter than the idle gear 30 is so that the rotating speed is increased between the gears 30 and 34. The first inter-axle differential gear mechanism 35 is of a single pinion type whereas the second inter-axle differential gear mechanism 36 is of a double pinion type. The first differential gear mechanism 35 includes a sun gear 35a splined to the transfer shaft 9, a pinion carrier 35b carrying pinions 35d which are engagement with the sun gear 35a and a ring gear 35c. The second differential gear mechanism 36 includes a sun gear 36a which is integral with the sun gear 35a in the first gear mechanism 35. The second gear mechanism 36 further includes a pinion carrier 36b which is integral with the ring gear of the first gear mechanism 35. The pinion carrier 36b carries pinions which are engaged on one hand with the sun gear 36a and on the other hand with a ring gear 36c. Thus, the differential gear mechanisms 35 and 36 are arranged in side-by-side relationship on the transfer shaft 9.

In order to selectively connect the first and second differential gear mechanisms 35 and 36 with the gear 34, there is provided a selecting mechanism 37. The selecting mechanism 37 includes an axially slidable sleeve 38 which has internal splines engaged with external splines on a spline member 34a secured to the gear 34. The pinion carrier 35b of the first gear mechanism 35 is formed with external splines and the sleeve 38 is further formed with second internal splines which are axially located so that the second internal splines on the sleeve 38 are engaged with the external splines on the pinion carrier 35b when the sleeve 38 is moved axially leftward as shown in FIG. 2 to transmit a rotation between the gear and the pinion carrier 35b of the first gear mechanism 35.

It will be noted in FIG. 2 that the sleeve 38 is further formed with external splines. The ring gear 36c of the second gear mechanism 36 has an axial extension which is formed with internal splines. The internal splines on the extension of the ring gear 36c are located so that they are engaged with the external splines on the sleeve 38 when the sleeve is shifted toward right from the position shown in FIG. 2 to thereby connect the gear 34 with the ring gear 36c of the second gear mechanism 36. The pinion carrier 36b of the second gear mechanism 36 is connected with the aforementioned output bevel gear 13 which is in meshing engagement with the bevel gear 14.

The transfer shaft 9 is formed at the left hand end portion integrally with a gear 39 which is in engagement with a gear 40 provided rotatably on the sleeve 25. The gear 40 is formed integrally with a sun gear 32a of the speed reduction gear mechanism 32 which includes a pinion carrier 32b secured to the sleeve 25 of the front inter-wheel differential gear mechanism 26. The pinion carrier 32b carries pinions 32d which are engaged on one hand with the sun gear 32a and on the other hand with a ring gear 32c which is formed on a housing 33 secured to the casing 4 of the transmission 3.

It will be understood that in operation the sleeve 38 is shifted to the left or right position as desired. When the sleeve 38 is in the left position, the gear 34 is connected with the pinion carrier 35b of the first differential gear mechanism 35. Thus, the driving torque from the transmission 3 is transmitted from the output gear 7a of the transmission 3 through the idle gear 30 to the gear 34 and then through the sleeve 38 to the pinion carrier 35b of the first differential gear mechanism 35. The torque is then split by being transmitted on one hand through the sun gear 35a of the gear mechanism 35 to the transfer shaft 9 and on the other hand through the ring gear 35c of the first gear mechanism 35 and the pinion carrier 36b of the second gear mechanism 36 to the bevel gear 13 which drives the bevel gear 14. Thus, the driving torque split by the first differential gear mechanism 35 is transmitted to the front and rear inter-wheel differential gear mechanisms 26 and 17, respectively.

When the sleeve 38 is shifted to the right position, the gear 34 is connected with the ring gear 36c of the second differential gear mechanism 36. The driving torque from the transmission 3 is then split by being transmitted on one hand through the pinions and the sun gear 36a of the second gear mechanism 36 to the transfer shaft 9 and on the other hand through the pinion carrier 36b of the second gear mechanism 36 to the bevel gear 13 which drives the bevel gear 14.

It should be noted that the first and second differential gear mechanisms 35 and 36 have different torque split ratios. For example, the first gear mechanism 35 may have a torque split ratio of 31-to-69 in which 31% of the driving torque from the transmission is applied to the front inter-wheel differential gear mechanism 26 and 69% of the driving torque is applied to the rear inter-wheel differential gear mechanism 17. Then, the second inter-axle differential gear mechanism 36 may have a torque split ratio of 50-to-50 wherein the driving torque is equally split between the front and rear inter-wheel differential gear mechanisms 35 and 36.

The viscous coupling 31 provided between the idle gear 30 connected with the output gear 7a of the transmission 3 and the sleeve 25 integral with the differential casing 27 of the front inter-wheel differential gear mechanism 26 functions to prevent an excessive difference being produced between the rotating speed of the front axle 8 and that of the rear axle 16. For example, when one or both of the front wheels 12 start to slip, the rear wheels 24 may be locked so that the driving torque will no longer be transmitted to the rear wheels 24. In such a condition, the rotating speed of the sleeve 25 will be increased. The viscous coupling 31 functions to suppress the increase in the speed of the sleeve 25 beyond a predetermined value to thereby prevent the rear wheels from being locked. It will be noted that in the illustrated arrangement the viscous coupling can be conveniently provided.

It will be noted that in the illustrated embodiment the speed reduction gear mechanism 32 is provided between the inter-axle differential gear mechanisms and the front inter-wheel differential gear mechanism. This arrangement is advantageous in that the torque transmitted through the speed reduction gear mechanism can be decreased so that the gear mechanism can be of a smaller capacity. The speed reduction gear mechanism is of a planetary type provided coaxially on the front drive axle. This arrangement will make the structure compact.

It should further be noted that the illustrated embodiment includes a differential lock mechanism 44 which releasably locks the differential gear mechanisms 35 and 36. The mechanism 44 includes an external spline 44a formed on an axial extension provided integrally with the idle gear 30 at a side of the differential gear mechanism 26 opposite to the idle gear 30 and a spline ring 44b secured to the differential casing 27 of the front inter-wheel differential gear mechanism. A internally splined sleeve 43 is provided for selectively connecting the external spline 44a with the spline ring 44b. When the external spline 44a is connected with the spline ring 44b, the idle gear 30 is directly connected with the differential casing 27. Since the idle gear 30 provides the input member of the differential gear mechanisms 35 and 36 and the differential casing 27 provides the input member of the differential gear mechanisms 35 and 36, these differential gear mechanisms 35 and 36 are locked by the engagement of the sleeve 43 and the spline ring 44b.

The invention has thus been shown and described with reference to a specific embodiment, however, it should be noted that the invention is in no way limited to the details of the illustrated structures but changes and modifications may be made without departing from the scope of the appended claims.

I claim:

1. A motor vehicle having a body,
   front and rear wheels respectively provided in front and rear portions of the body,
   a power transmitting mechanism including transmission means having an input member and an output member arranged in a transverse direction of the body,
   first drive axle means arranged in a transverse direction of the body and connected with one of the front and rear wheels for transmitting a rotation to said one of the front and rear wheels,
   second drive axle means arranged in a transverse direction of the body and connected with the other of the front and rear wheels for transmitting a rotation to said other of the front and rear wheels,
   a transfer shaft arranged to extend in a transverse direction of the body and provided with torque splitting means for transmitting a driving torque from the transmission means to said first and second drive axle means with a predetermined torque splitting ratio, said torque splitting means including a plurality of inter-axle differential gear mechanisms having different torque splitting ratios and selecting means for selectively operating one of said differential gear mechanisms to establish a desired torque splitting ratio between the first and second drive axle means, said transfer shaft being located adjacent to said first drive axle means, said first drive axle means carrying an idle gear which is in engagement with an output member of said transmission means and an input member of said torque splitting means, said idle gear being of a larger diameter than said input member of said torque splitting means so that rotation speed is increased between said idle gear and said input member of the torque splitting means.

2. A motor vehicle in accordance with claim 1 in which said first drive axle means includes an inter-wheel differential gear mechanism having an input member, viscous coupling means provided between said input member of the inter-wheel differential gear mechanism and said idle gear.

3. A motor vehicle in accordance with claim 1 in which said first drive axle means includes an inter-wheel differential gear mechanism, said idle gear being positioned at one side of said inter-wheel differential gear mechanism, speed reduction gear means provided between said torque splitting means and said inter-wheel differential gear mechanism, said speed reduction gear means being located at a side of said idle gear opposite to said inter-wheel differential gear mechanism.

4. A motor vehicle in accordance with claim 3 in which means is provided at a side of the inter-wheel differential gear mechanism opposite to the idle gear for releasably connecting said idle gear with said input member of the inter-wheel differential gear mechanism to lock said inter-axle differential gear mechanisms.

5. A motor vehicle having a body, front and rear wheels respectively provided in front and rear portions of the body, a power transmitting mechanism including transmission means having an input member and an output member arranged in a transverse direction of the body, first drive axle means arranged in a transverse direction of the body and connected with one of the front and rear wheels for transmitting a rotation to said one of the front and rear wheels, second drive axle means arranged in a transverse direction of the body and connected with the other of the front and rear wheels for transmitting a rotation to said other of the front and rear wheels, a transfer shaft arranged to extend in a transverse direction of the body and provided with torque splitting means for transmitting a driving torque from the transmission means to said first and second drive axle means with a predetermined torque splitting ratio, said torque splitting means including a plurality of inter-axle differential gear mechanisms having different torque splitting ratios and selecting means for selectively operating one of said differential gear mechanisms to establish a desired torque splitting ratio between the first and second drive axle means, each of said inter-axle differential gear mechanisms being a planetary gear mechanism including a sun gear, at least one pinion carried by a pinion carrier and ring gear, an input member provided on said transfer shaft and connected with said transmission means to be driven thereby, said selecting means being located between said input member and said inter-axle differential gear mechanisms, said selecting means having means for connecting said input member alternately with said pinion carrier of one of the inter-axle differential gear mechanisms and with said ring gear of the other of the inter-axle differential gear mechanisms, said one gear mechanism being located adjacent to said selecting means, said pinion carrier of said one gear mechanism being connected with said ring gear of the other gear mechanism.

6. A motor vehicle in accordance with claim 5 in which said sun gears of the differential gear mechanisms are connected with said transfer shaft for transmitting a driving torque to said first drive axle means, said pinion carrier of said other gear mechanism being connected with said second drive axle means.

7. A motor vehicle having a body, front and rear wheels respectively provided in front and rear portions of the body, a power transmitting mechanism including transmission means having an input member and an output member arranged in a transverse direction of the body, first drive axle means arranged in a transverse direction of the body and connected with one of the front and rear wheels for transmitting a rotation to said one of the front and rear wheels, second drive axle means arranged in a transverse direction of the body and connected with the other of the front and rear wheels for transmitting a rotation to said other of the front and rear wheels, a transfer shaft arranged to extend in a transverse direction of the body and provided with torque splitting means for transmitting a driving torque from the transmission means to said first and second drive axle means with a predetermined torque splitting ratio, said torque splitting means including a plurality of inter-axle differential gear mechanisms having different torque splitting ratios and selecting means for selectively operating one of said differential gear mechanisms to establish a desired torque splitting ratio between the first and second drive axle means, said first drive axle means being provided with an inter-wheel differential gear mechanism having an input member, an idle gear being provided on said transfer shaft and connected with said transmission means to be driven thereby, second selecting means provided on said first drive axle means for selectively connecting said idle gear with said input member of said inter-wheel differential gear mechanism to lock said inter-axle differential gear mechanisms.

8. A motor vehicle having a body,
front and rear wheels respectively provided in front and rear portions of the body,
a power transmitting mechanism including transmission means having an input member and an output member arranged in a transverse direction of the body,
first drive axle means arranged in the vicinity of the power transmitting mechanism in a transverse direction of the body and connection with one of the front and rear wheels for transmitting a rotation to said one of the front and rear wheels,
second drive axle means arranged in a transverse direction of the body and connected with the other of the front and rear wheels for transmitting a rotation to said other of the front and rear wheels,
a transfer shaft arranged in the vicinity of the first drive axle means to extend in a transverse direction of the body and provided with torque splitting means for transmitting a driving torque from the transmission means to said first and second drive axle means with a predetermined torque splitting ratio,
said torque splitting means including a plurality of inter-axle differential gear mechanisms having different torque splitting ratios and selecting means for selectively operating one of said differential gear mechanisms to establish a desired torque splitting ratio between the first and second drive axle means,
said transfer shaft being located adjacent to said first drive axle means,
said first drive axle means carrying an idle gear which is in engagement with said output member of said transmission means and said input member of said torque splitting means.

* * * * *